W. P. HILL.
DOWEL PIN LOCK.
APPLICATION FILED APR. 15, 1920. RENEWED MAY 5, 1922.
1,435,233. Patented Nov. 14, 1922.
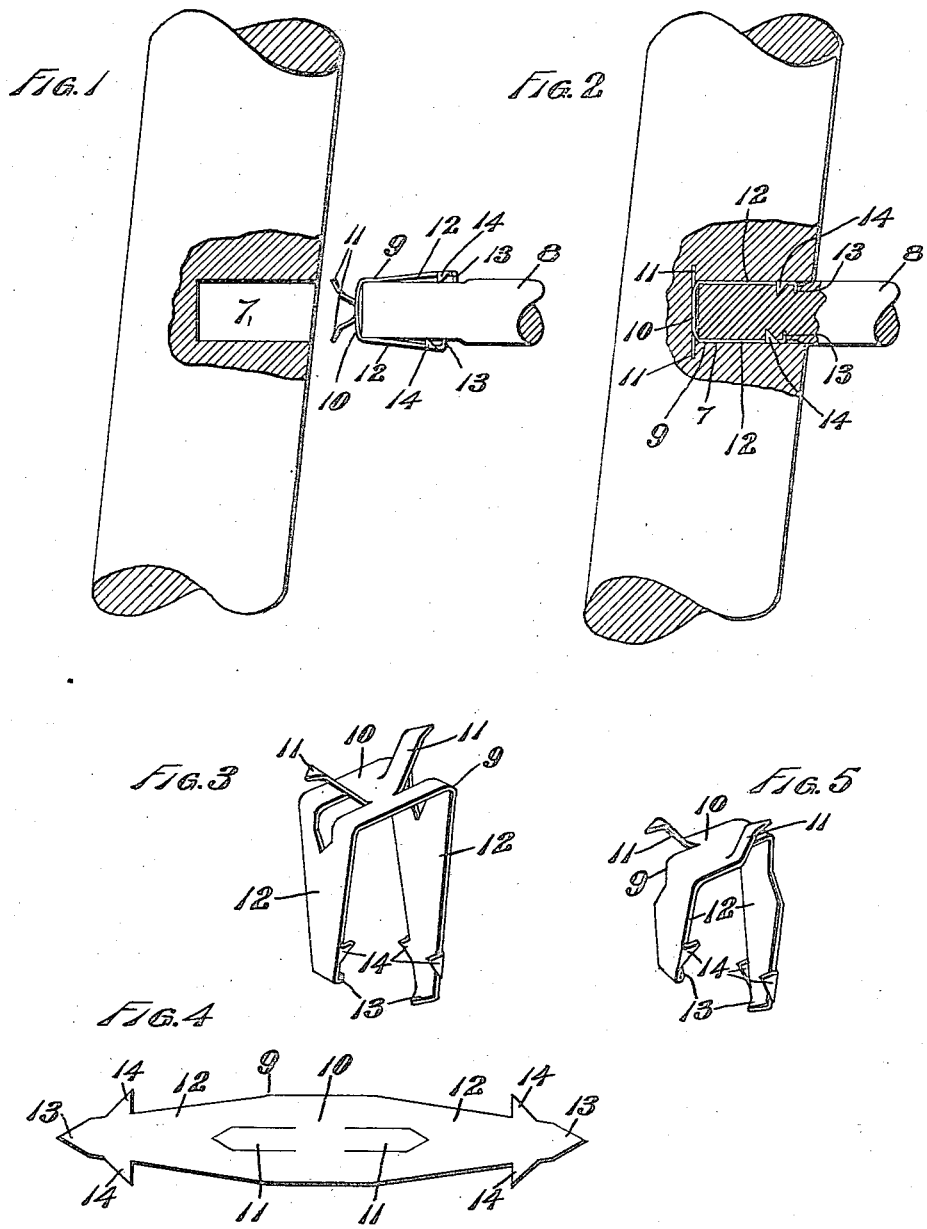
INVENTOR
WILLIAM P. HILL
BY Edward C. Logan
ATTY.

Patented Nov. 14, 1922.

1,435,233

UNITED STATES PATENT OFFICE.

WILLIAM P. HILL, OF ST. LOUIS, MISSOURI, ASSIGNOR TO THE UNIVERSAL DOWEL ANCHOR CO., OF ST. LOUIS, MISSOURI, A CORPORATION OF MISSOURI.

DOWEL-PIN LOCK.

Application filed April 15, 1920, Serial No. 374,069. Renewed May 5, 1922. Serial No. 558,773.

*To all whom it may concern:*

Be it known that I, WILLIAM P. HILL, a citizen of the United States of America, and a resident of the city of St. Louis and State of Missouri, have invented certain new and useful Improvements in Dowel-Pin Locks, of which the following is a specification containing a full, clear, and exact description, reference being had to the accompanying drawings, forming a part thereof.

My invention relates to new and useful improvements in dowel pin locks or anchors and has for its primary object the construction of a fastener or anchor for dowel pins stamped from a single piece of material and which may be employed in the manufacture of various kinds of furniture and like purposes thus eliminating the use of glue or other adhesives.

In the drawings:

Fig. 1 is a side elevation of my improvement applied to a dowel pin and ready to be inserted in the mortise of a chair leg with parts broken away and in section.

Fig. 2 is a fragmental sectional view illustrating the dowel pin applied to the mortise.

Fig. 3 is a detailed perspective view of my improvement.

Fig. 4 is a plan view of my improvement illustrating the same before being bent into final form.

Fig. 5 is a perspective view of a modified form of my improvement.

Referring to the drawings 7 indicates a mortise and 8 a dowel pin, having my fastener or anchor 9 applied thereon. The anchor, fastener or lock comprises a body or base portion 10, from which prongs 11 are stamped or struck. Formed integrally with base portion 10 are tapering arms 12 one of which is longer than the other. Each of the arms 12 is provided with inturned prongs 13 and 14. In the modified form shown in Fig. 5 the tongues or prongs 11 are stamped from the sides of the body or base portion 10. In the modified form shown in Fig. 6 the body or base portion 10 is provided on each side with a crescent shaped portion 15. These crescent shaped portions 15, are partly separated from the base portion 10 by means of slits 16.

In applying my improvement for use the dowel pin 8 is inserted between the arms 12 as illustrated in Fig. 1 and then the dowel pin with the anchor or fastener applied thereto is driven into the mortise 7 as illustrated in Fig. 2. The driving of the fastener in the mortise will cause prongs 13 and 14 to be driven into the dowel pin 8 and the prongs 11 to be inserted into the material surrounding the mortise 7 by means of which the dowel pin 8 is firmly secured within the mortise.

It will be noted that the arms 12 are of unequal length and diverge slightly—the purpose of the unequal length being so as to take care of the unequal length of the mortise, the upper side being longer than the lower. The purpose of diverging the arms 12 is so that the lock can be readily slipped on the dowel 8, and when the dowel is driven into the mortise, the pressure exerted by the sides of the mortise on the arms 12 will force the prongs 13 and 14 into the dowel.

Having fully described my invention, what I claim is:—

1. A dowel pin fastener stamped from a single piece of metal and provided with a base portion and substantially parallel arms of unequal length, inturned prongs carried by said arms, and a pair of upwardly projecting prongs formed integrally with the base portion and extending at an angle less than a right angle to the base portion, said prongs being provided with sharpened points substantially parallel with the base portion.

2. A dowel pin fastener stamped from a single piece of metal and provided with a base portion and two substantially parallel arms formed integrally with the base portion, prongs formed integrally with said arms, upwardly projecting prongs pointing in opposite directions formed integrally with the base portion and arranged at less than a rightangle and of sufficient length so that when bent in line with the base portion they will project beyond the base portion, said prongs provided with sharpened points substantially parallel with the base portion.

In testimony thereof, I have signed my name to this specification.

WILLIAM P. HILL.